United States Patent
Okumura et al.

(10) Patent No.: US 11,637,320 B2
(45) Date of Patent: Apr. 25, 2023

(54) METHOD FOR MANUFACTURING ELECTROLYTE SOLUTION MATERIAL

(71) Applicant: NIPPON SHOKUBAI CO., LTD., Osaka (JP)

(72) Inventors: Yasunori Okumura, Suita (JP); Shimpei Sato, Suita (JP); Masayuki Okajima, Osaka (JP); Takayuki Kobatake, Osaka (JP); Hiromoto Katsuyama, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 11 days.

(21) Appl. No.: 15/515,261

(22) PCT Filed: Oct. 5, 2015

(86) PCT No.: PCT/JP2015/078252
§ 371 (c)(1),
(2) Date: Mar. 29, 2017

(87) PCT Pub. No.: WO2016/052752
PCT Pub. Date: Apr. 7, 2016

(65) Prior Publication Data
US 2017/0214092 A1    Jul. 27, 2017

(30) Foreign Application Priority Data

Oct. 3, 2014  (JP) .............................. JP2014-204815
Jun. 11, 2015  (JP) .............................. JP2015-118065

(51) Int. Cl.
| | |
|---|---|
| H01M 10/0568 | (2010.01) |
| H01M 10/0569 | (2010.01) |
| C01B 21/083 | (2006.01) |
| C01B 21/086 | (2006.01) |
| H01G 9/20 | (2006.01) |
| H01G 11/60 | (2013.01) |
| H01G 11/62 | (2013.01) |
| H01M 10/0525 | (2010.01) |
| H01G 11/64 | (2013.01) |

(52) U.S. Cl.
CPC ....... *H01M 10/0568* (2013.01); *C01B 21/083* (2013.01); *C01B 21/086* (2013.01); *H01G 9/2004* (2013.01); *H01G 11/60* (2013.01); *H01G 11/62* (2013.01); *H01M 10/0525* (2013.01); *H01M 10/0569* (2013.01); *C01P 2006/40* (2013.01); *H01G 11/64* (2013.01); *H01M 2300/0028* (2013.01); *Y02E 60/13* (2013.01)

(58) Field of Classification Search
None
See application file for complete search history.

(56) References Cited

U.S. PATENT DOCUMENTS

| | | | | |
|---|---|---|---|---|
| 5,395,486 | A * | 3/1995 | Killian | ............ H01M 10/0567 260/665 R |
| 9,079,780 | B2 * | 7/2015 | Sato | .................... C01B 21/0935 |
| 2003/0022069 | A1 | 1/2003 | Karube et al. | |
| 2009/0053612 | A1 | 2/2009 | Ihara et al. | |
| 2011/0034716 | A1 * | 2/2011 | Okumura | .............. C07C 303/40 556/69 |
| 2013/0068991 | A1 | 3/2013 | Sato et al. | |
| 2015/0086466 | A1 | 3/2015 | Sato et al. | |
| 2016/0028124 | A1 | 1/2016 | Ihara et al. | |

FOREIGN PATENT DOCUMENTS

| | | |
|---|---|---|
| JP | 2006-210816 | 8/2006 |
| JP | 2006-210816 A | 8/2006 |
| JP | 2009-54407 | 3/2009 |
| JP | 2013-211224 A | 10/2012 |
| JP | 2013-84562 | 5/2013 |
| JP | 2013-084562 A | 5/2013 |

(Continued)

OTHER PUBLICATIONS

International Search Report dated Dec. 15, 2015 in International (PCT) Application No. PCT/JP2015/078252.

(Continued)

*Primary Examiner* — Anca Eoff
(74) *Attorney, Agent, or Firm* — Maschoff Brennan

(57) ABSTRACT

An electrolytic solution comprising N-(fluorosulfonyl)-N-(fluoroalkylsulfonyl)imide or di(fluorosulfonyl)imide, from which a residual solvent that affects the properties of the electrolyte solution material is reduced, is provided. A method for producing an electrolyte solution material containing fluorosulfonyl imide salt represented by the following general formula (1) and an electrolyte solution preparation solvent comprises decompressing and/or heating a solution containing the fluorosulfonyl imide salt and the electrolyte solution preparation solvent to volatilize a production solvent for the fluorosulfonyl imide salt.

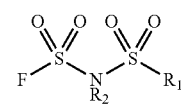

(1)

In general formula (1), $R_1$ represents a fluorine atom or a fluorinated alkyl group having 1 to 6 carbon atoms, $R_2$ represents an alkali metal ion.

5 Claims, No Drawings

(56) References Cited

FOREIGN PATENT DOCUMENTS

| JP | 2013-211224   | 10/2013 |
| JP | 2014-201453   | 10/2014 |
| JP | 2014-201453 A | 10/2014 |
| JP | 2014-201453 A | 10/2015 |
| WO | 2011/149095   | 12/2011 |

OTHER PUBLICATIONS

Extended European Search Report dated Apr. 20, 2018 in European Application No. 15846096.4.
Office Action dated Nov. 19, 2018 in corresponding Chinese Patent Application No. 201580053743.8 with English translation.
Decision of Rejection dated Nov. 20, 2018 in corresponding Japanese Patent Application No. 2016-552361 with English translation.
Office Action dated Feb. 6, 2018 in Japanese Application No. 2016-552361, with English translation.

\* cited by examiner

METHOD FOR MANUFACTURING ELECTROLYTE SOLUTION MATERIAL

TECHNICAL FIELD

The present invention relates to a fluorosulfonyl imide, and more particularly to an electrolyte solution material containing N-(fluorosulfonyl)-N-(fluoroalkylsulfonyl)imide or di(fluorosulfonyl)imide and a method for producing the same.

BACKGROUND ART

A fluorosulfonyl imide such as N-(fluorosulfonyl)-N-(fluoroalkylsulfonyl)imide, di(fluorosulfonyl)imide, and derivatives thereof are useful as intermediates for compounds having a $N(SO_2F)$ group or an $N(SO_2F)_2$ group, and are also useful compounds in various applications, for example, electrolytes, additives for electrolyte solutions of fuel cells, selective electrophilic fluorinating agents, photo-acid generators, thermal acid generators, and near infrared light-absorbing dyes. In addition, however, a fluorosulfonylimide is such a compound that it is quite difficult to remove impurities therefrom due to outstanding polarity thereof.

Patent Document 1 discloses a method for producing a powder by removing a reaction solvent from an alkali metal salt of a fluorosulfonylimide. In this document, the problem that the alkali metal salt of the fluorosulfonylimide has high affinity for the reaction solvent and therefore it is difficult to remove the solvent is disclosed, and a solvent distillation method for solving the problem is also disclosed.

PRIOR ART DOCUMENT

Patent Document

Patent Document 1: WO 2011/149095

DISCLOSURE OF THE INVENTION

Problem to be Solved by the Invention

However, in the production method disclosed in Patent Document 1, about 1000 ppm of a residual solvent (particularly a solvent used in the production of a fluorosulfonylimide) still remains in the alkali metal salt of the fluorosulfonylimide. Furthermore, once the fluorosulfonylimide salt is formed into a powder, the residual solvent (the above-mentioned production solvent) is incorporated into the powder and therefore it is difficult to remove the residual solvent merely by drying. For example, in the case where the fluorosulfonylimide salt is intended to be used as an electrolytic substance for a lithium battery, the residual solvent may cause the swelling of a battery. Particularly a halogen-based solvent can cause the corrosion of an aluminum current collector in a lithium battery upon the decomposition of the halogen-based solvent, and therefore it is required to reduce the amount of the residual solvent particularly in an electrolyte solution to be used in an automotive battery that is intended to be used for a long period.

Thus, the present invention is made with focusing attention on the above-mentioned situations. The object of the present invention is to provide: an electrolyte solution material from which a residual solvent that may affect the properties of the electrolyte solution material is reduced; and a method for producing the electrolyte solution material.

Means for Solving the Problems

The production method according to the present invention by which the above-mentioned problem can be solved is a method for producing an electrolyte solution material containing a fluorosulfonylimide salt represented by general formula (1) and a solvent for an electrolyte solution, and is characterized in decompressing and/or heating a solution containing the fluorosulfonylimide salt and the electrolyte solution solvent to volatilize a fluorosulfonylimide salt production solvent.

[Chemical formula 2]

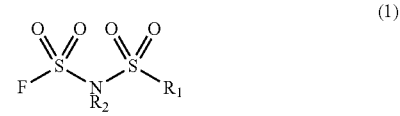

In general formula (1), $R_1$ represents a fluorine atom or a fluorinated alkyl group having 1 to 6 carbon atoms, and $R_2$ represents an alkali metal ion. The electrolyte solution solvent is preferably a cyclic carbonate-based solvent or a cyclic ester-based solvent.

The present invention also includes, within the scope thereof, a method for producing a non-aqueous electrolyte solution, comprising mixing the electrolyte solution material produced by the above-mentioned method with a non-aqueous electrolyte solution preparation solvent.

In addition, the present invention also includes, within the scope thereof, an electrolyte solution material comprising the fluorosulfonylimide salt represented by general formula (1) and an electrolyte solution solvent, wherein a concentration of the fluorosulfonylimide salt contained in the electrolyte solution material is 30% by mass or more and a residual amount of a fluorosulfonylimide salt production solvent contained in the electrolyte solution material is 3000 ppm or less.

In this case, it is preferred that a cyclic carbonate-based solvent or a cyclic ester-based solvent is contained in an amount of 90% by mass or more in the electrolyte solution solvent.

In addition, the present invention also includes, within the scope thereof: a non-aqueous electrolyte solution produced from the electrolyte solution material; and an electrical storage device provided with the non-aqueous electrolyte solution.

In addition, the present invention also includes, within the scope thereof: a method for storing an electrolyte solution material, comprising storing an electrolyte solution material containing the fluorosulfonylimide salt represented by general formula (1) and an electrolyte solution solvent, wherein a concentration of the fluorosulfonylimide salt is 30% by mass or more; and a method for transporting an electrolyte solution material, comprising transporting an electrolyte solution material containing the fluorosulfonylimide salt represented by general formula (1) and an electrolyte solution solvent, wherein the concentration of the fluorosulfonylimide salt is 30% by mass or more.

In the present invention, an electrolyte solution solvent is added to a fluorosulfonylimide salt which is formed into a powder and into which the residual solvent is incorporated to dissolve the fluorosulfonylimide salt in the electrolyte solution solvent, thereby producing a solution. In this case, the residual solvent becomes more volatilizable, and the electrolyte solution solvent has higher affinity for the fluorosulfonylimide salt than the residual solvent. Therefore, the residual solvent can be removed with higher efficiency by decompression and/or heating. Furthermore, the resultant solution can be used as an electrolyte solution material without any modification. The present invention enables the removal of the residual solvent from the powder, and also enables the removal of the residual solvent from a solution having the fluorosulfonylimide salt dissolved in the residual solvent by adding the electrolyte solution solvent and then decompressing and/or heating the resultant solution.

Effect of the Invention

According to the present invention, it is possible to produce an electrolyte solution material containing N-(fluorosulfonyl)-N-(fluoroalkylsulfonyl)imide or di(fluorosulfonyl)imide, from which a residual solvent that affects the properties of the electrolyte solution material is reduced. Because the electrolyte solution material has a liquid form, the need for a facility for handing a highly hygroscopic fluorosulfonylimide salt powder can be eliminated and therefore the cost of the production of the product can be reduced. Furthermore, a non-aqueous electrolyte solution can be produced from the electrolyte solution material according to the present invention without any modification or by merely diluting the electrolyte solution material according to the present invention, and therefore the workability can be improved and the non-aqueous electrolyte solution can be produced in a simple manner at low cost. In addition, when the electrolyte solution material, which has a liquid form, is prepared previously, an effect of reducing the amount of heat (dissolution heat) generated upon mixing the fluorosulfonylimide salt powder with an electrolyte solution solvent can also be achieved. The electrolyte solution material according to the present invention also has the advantage that the electrolyte solution material generates HF in a reduced amount during the storage of the electrolyte solution material in the form of a solution.

When an electrolyte solution material containing the fluorosulfonylimide salt represented by general formula (1) (also referred to as "fluorosulfonylimide salt (1)", hereinafter) and a cyclic carbonate-based solvent or a cyclic ester-based solvent as the main components is used, the increase in temperature to a temperature at which a non-aqueous electrolyte solution can be decomposed can be prevented, and the need for adjusting the rate of addition of the fluorosulfonylimide salt (1) in the preparation of the non-aqueous electrolyte solution can be eliminated, resulting in the improvement in productivity. Thus, according to the method of the present invention, a fluorosulfonylimide salt-containing non-aqueous electrolyte solution having better quality can be produced within a shorter time compared with the conventional production methods.

MODE FOR CARRYING OUT THE INVENTION

The present inventors have made studies for the purpose of providing a method for producing a non-aqueous electrolyte solution containing a fluorosulfonylimide salt (1) and having better quality compared with the conventional ones with high efficiency. As a result, it is found that, when an electrolyte solution material which contains a fluorosulfonylimide salt (1) and a cyclic carbonate-based solvent or a cyclic ester-based solvent as the main components and which is prepared previously is used as a starting material for a non-aqueous electrolyte solution, it becomes possible to produce the non-aqueous electrolyte solution within a shorter time compared with the conventional methods while preventing the heat-induced deterioration of the non-aqueous electrolyte solution and while keeping the quality of the non-aqueous electrolyte solution at a good level even when an electrolyte solution preparation solvent or another electrolyte salt is added to the electrolyte solution material in the subsequent non-aqueous electrolyte solution production process. This finding leads to the accomplishment of the present invention.

First, the details of the accomplishment of the present invention will be described. Heretofore, in the production of a non-aqueous electrolyte solution, a solvent solution comprising a mixture of all of electrolyte solution preparation solvents to be used, e.g., ethylene carbonate, methyl ethyl carbonate, diethyl carbonate, is prepared previously, and then an electrolyte salt, e.g., a fluorosulfonylimide salt (1), is added to the solvent solution. In the preparation of the solvent solution, ethylene carbonate has a solid form at ambient temperature and therefore is usually heated to a temperature higher than the melting point of ethylene carbonate (generally a temperature higher than 50° C.) and is then added to another electrolyte solution preparation solvent. As a result, the temperature of the solvent solution at which the fluorosulfonylimide salt (1) is to be added is increased, and therefore the temperature of the solution is increased to a temperature not lower than 60° C. by an exothermal reaction occurring upon the addition of the fluorosulfonylimide salt (1), resulting in the deterioration in the non-aqueous electrolyte solution. For the purpose of solving this problem, it has been needed to control the rate of addition of the fluorosulfonylimide salt (1) so as to control the increase in temperature of the solution. In this case, however, it takes long time to prepare the non-aqueous electrolyte solution and productivity is unsatisfactory, resulting in the increase in cost, as mentioned above.

Thus, the present inventors have made studies on the non-aqueous electrolyte solution production processes. As a result, it is found that: when an electrolyte solution material that contains a fluorosulfonylimide salt (1) and a cyclic carbonate-based solvent or a cyclic ester-based solvent as the main components and is prepared previously is used, a heat treatment of the cyclic carbonate-based solvent or the cyclic ester-based solvent each having a solid form, which has been needed in the conventional non-aqueous electrolyte solution production processes, can be eliminated; and when an electrolyte solution material having a temperature of about room temperature is used as a starting material and a desired non-aqueous electrolyte solution preparation solvent and a desired electrolyte salt are added to the electrolyte solution material, even if an exothermal reaction occurs as the result of the above-mentioned addition, the temperature of the solution never increases to a temperature at which the electrolyte can be decomposed, and therefore the need for controlling the electrolyte salt addition rate for temperature controlling purposes, which has been needed in the conventional methods, can also be eliminated, resulting in the achievement of the preparation of a non-aqueous electrolyte solution within a short time. This finding leads to the accomplishment of the present invention.

The term "fluorosulfonyl imide" in the present invention includes, in addition to di(fluorosulfonyl)imide having two fluorosulfonyl groups, N-(fluorosulfonyl)-N-(fluoroalkylsulfonyl)imide having a fluorosulfonyl group and a fluorinated alkyl group. The term "chlorosulfonylimide", which is a starting material, is the same.

The production method according to the present invention is a method for producing an electrolyte solution material containing the fluorosulfonylimide salt represented by general formula (1) and a solvent, and is characterized in decompressing and/or heating a solution containing the fluorosulfonylimide salt and the electrolyte solvent to volatilize the fluorosulfonylimide salt production solvent (wherein the step is also referred to as a "volatilization step, hereinafter). The term "fluorosulfonylimide salt production solvent" as used herein refers to a solvent which is used in the production of the fluorosulfonylimide salt and is contained in a fluorosulfonylimide salt produced by the conventional production method, and has the same meaning as the term "residual solvent".

The compound represented by general formula (1) includes a compound wherein $R_1$ represents a fluorine atom or a fluorinated alkyl group having 1 to 6 carbon atoms. The number of carbon atoms in the fluorinated alkyl group is preferably 1 to 6, more preferably 1 to 4. Specific examples of the fluorinated alkyl group having 1 to 6 carbon atoms include a fluoromethyl group, a difluoromethyl group, a trifluoromethyl group, a fluoroethyl group, a difluoroethyl group, a 2,2,2-trifluoroethyl group, a pentafluoroethyl group, a 3,3,3-trifluoropropyl group, a perfluoro-n-propyl group, a fluoropropyl group, a perfluoroisopropyl group, a fluorobutyl group, a 3,3,4,4,4-pentafluorobutyl group, a perfluoro-n-butyl group, a perfluoroisobutyl group, a perfluoro-t-butyl group, a perfluoro-sec-butyl group, a fluoropentyl group, a perfluoropentyl group, a perfluoroisopentyl group, a perfluoro-t-pentyl group, a fluorohexyl group, a perfluoro-n-hexyl group and a perfluoroisohexyl group. Among these groups, $R_1$ is preferably a fluorine atom, a trifluoromethyl group, a pentafluoroethyl group or a perfluoro-n-propyl group, more preferably a fluorine atom, a trifluoromethyl group or a pentafluoroethyl group.

$R_2$ is a cation constituting the compound (1), and represents an alkali metal ion. Specific examples of the alkali metal element include lithium, sodium, potassium, rubidium and cesium. Among them, the alkali metal element is preferably lithium, sodium or potassium, more preferably lithium.

Examples of the compound represented by general formula (1) include lithium di(fluorosulfonyl)imide, sodium di(fluorosulfonyl)imide, lithium (fluorosulfonyl)(trifluoromethylsulfonyl)imide, sodium (fluorosulfonyl)(trifluoromethylsulfonyl)imide, lithium (fluorosulfonyl)(pentafluoroethylsulfonyl)imide and the like. The compound represented by general formula (1) is more preferably lithium di(fluorosulfonyl)imide and lithium (fluorosulfonyl)(trifluoromethylsulfonyl)imide.

In the present invention, the method for synthesizing the fluorosulfonylimide salt represented by compound (1) is not particularly limited, and any one of the conventional known methods can be employed. For example, methods disclosed in WO2011/149095, Japanese Unexamined Patent Application Publication (JP-A) No. 2010-189372, Japanese Unexamined Patent Application Publication (Translation of PCT Application) No. Hei 8-511274, WO2012/108284, WO2012/117961, WO2012/118063, JP-A No. 2010-280586, JP-A No. 2010-254543, JP-A No. 2007-182410, WO2010/010613 and the like are exemplified.

The method for producing an electrolyte solution material containing the fluorosulfonylimide salt represented by general formula (1) and a solvent for an electrolyte solution according to the present invention is characterized by comprising a step of decompressing and/or heating a solution, which is prepared by mixing the fluorosulfonylimide salt with the electrolyte solution solvent, to volatilize a fluorosulfonylimide salt production solvent. As mentioned above, even when the fluorosulfonylimide salt is isolated in the form of a powder (a solid material), the fluorosulfonylimide salt still contains a solvent used before the isolation (wherein the solvent is also referred to as a "residual solvent" or a "production solvent", hereinafter). The concentration of the production solvent in the powder can be reduced by decompressing and/or heating the solution having the fluorosulfonylimide salt dissolved in the electrolyte solution solvent to volatilize the fluorosulfonylimide salt production solvent. In the method for producing the electrolyte solution material according to the present invention, it is also possible to add the electrolyte solution solvent to a solution produced by the production or purification of the fluorosulfonylimide salt (i.e., a solution containing the fluorosulfonylimide salt and the solvent) and then decompress and/or heat the resultant solution to volatilize the production solvent. It is also possible to produce the fluorosulfonylimide salt in this manner and subsequently produce the electrolyte solution material containing the fluorosulfonylimide salt and the electrolyte solution solvent.

The electrolyte solution solvent has higher affinity for the compound (1) and a higher boiling point compared with those of the residual solvent, and therefore the residual solvent can be volatilized and removed with higher efficiency by decompression and/or heating.

The term "residual solvent" as used herein refers to a solvent used in the reaction for producing the compound (1) or a solvent used in a step of purifying the compound (1). According to the classification of the residual solvent and the below-mentioned electrolyte solvent on the basis of the affinity thereof, specific examples of a solvent having a moderate level of affinity for the compound (1) include: water; an alcohol-based solvent, such as methanol, ethanol, propanol and butanol; a carboxylic acid-based solvent, such as formic acid and acetic acid; a ketone, such as acetone, methyl ethyl ketone, methyl isobutyl ketone and diisobutyl ketone; a nitrile-based solvent, such as isobutyronitrile, acetonitrile, valeronitrile and benzonitrile; an ester-based solvent, such as ethyl acetate, isopropyl acetate and butyl acetate; an aliphatic ether-based solvent, such as diethyl ether, diisopropyl ether, t-butyl methyl ether and cyclopentyl methyl ether; a halogen-based solvent, such as HF; a nitro-group-containing solvent, such as nitromethane and nitrobenzene; a nitrogenated organic solvent, such as ethylformamide and N-methylpyrrolidone; dimethyl sulfoxide; and a glyme-based solvent. Among these solvents, acetonitrile, valeronitrile, ethyl acetate, isopropyl acetate, butyl acetate and cyclopentyl methyl ether are preferred. Specific examples of a solvent having low affinity for the compound (1) include: an aromatic hydrocarbon-based solvent, such as toluene, o-xylene, m-xylene, p-xylene, benzene, ethylbenzene, isopropylbenzene, 1,2,3-trimethylbenzene, 1,2,4-trimethylbenzene, 1,3,5-trimethylbenzene, tetralin, cymene, methylethylbenzene, 2-ethyltoluene, chlorobenzene and dichlorobenzene; a linear aliphatic hydrocarbon-based solvent, such as pentane, hexane, heptane, octane, decane, dodecane, undecane, tridecane, decalin, 2,2,4,6,6-pentamethylheptane, isoparaffin (e.g., "MARUKASOL R" (a mixture of 2,2,4,6,6-pentamethylheptane and 2,2,4,4,6-pentamethylheptane, manufactured by Maruzen Petrochemical Co., Ltd.), "Isopar (registered trademark) G" (a C9-C11-mixed isoparaffin, manufactured by Exxon Mobil Corporation), "Isopar (registered trademark) E" (a C8-C10-mixed isoparaffin, manufactured by Exxon Mobil Corporation)), dichloromethane, chloroform and 1,2-dichloroethane; a cyclic aliphatic hydrocarbon-based solvent, such as cyclohexane, methylcyclohexane, 1,2-dimethylcyclohexane, 1,3-dimethylcyclohexane, 1,4-dimethylcyclohexane, ethylcyclohexane, 1,2,4-trimethylcyclohexane, 1,3,5-trimethylcyclohexane, propylcyclohexane, butylcyclohexane and "SWACLEAN 150" (a C9-alkylcyclohexane mixture, manufactured by Maruzen Petrochemical Co., Ltd.); and an aromatic ether-based solvent, such as anisole, 2-methylanisole, 3-methylanisole and 4-methylanisole. These solvents may be used singly, or two or more of them may be used in the form of a mixture. Among these solvents, toluene, o-xylene, m-xylene, p-xylene, ethylbenzene, isopropylbenzene, 1,2,4-trimethylbenzene, hexane, heptane, chlorobenzene, dichlorobenzene, dichloromethane and 1,2-dichloroethane are preferred.

The electrolyte solution solvent to be used in the present invention has higher affinity for the compound (1) compared with the residual solvent, and can be used suitable in the volatilization step. The electrolyte solvent to be used is a solvent that can be used as an electrolyte solution material without any modification. When the electrolyte solvent of this type is used, the residual solvent can be removed with high efficiency. The electrolyte solution material according to the present invention may be mixed with a solvent, an additive, an electrolyte and the like which are needed for the electrolyte solution material. The resultant mixture can be used without any modification as an electrolyte solution for a lithium secondary battery. The electrolyte solvent to be used can be selected appropriately depending on the affinity of the electrolyte solvent for the compound (1), the affinity of the residual solvent for the general formula (1), the boiling points of the solvents and the like. Specific examples of the solvent having high affinity for the compound (1) include: a carbonate-based solvent, such as ethylene carbonate, propylene carbonate, butylene carbonate, dimethyl carbonate, ethylmethyl carbonate and diethyl carbonate; a linear ether-based solvent, such as dimethoxymethane and 1,2-dimethoxyethane; a cyclic ether-based solvent, such as tetrahydrofuran, 2-methyltetrahydrofuran, 1,3-dioxane and 4-methyl-1,3-dioxolane; a cyclic ester-based solvent, such as γ-butyrolactone and γ-valerolactone; a sulfolane-based solvent, such as sulfolane and 3-methylsulfolane; and N,N-dimethylformamide, dimethyl sulfoxide and N-methyloxazolidinone. These solvents may be used singly, or two or more of them may be used in the form of a mixture. Among these exemplified solvents, a carbonate-based solvent such as ethylene carbonate, propylene carbonate, butylene carbonate, dimethyl carbonate, ethylmethyl carbonate and diethyl carbonate (particularly a cyclic carbonate, such as ethylene carbonate, propylene carbonate and butylene carbonate) and a cyclic ester-based solvent such as γ-butyrolactone and γ-valerolactone are preferred.

In the method for producing the electrolyte solution material according to the present invention, the solution to be used in the volatilization step can be prepared by mixing the electrolyte solution solvent with a powder of the fluorosulfonylimide salt represented by general formula (1). Alternatively, the volatilization step may be carried out by mixing the electrolyte solution solvent with a solution produced by the production and purification of the fluorosulfonylimide salt represented by general formula (1) in a solvent.

In the method for producing the electrolyte solution material according to the present invention, the lower limit of the amount of the residual solvent to be contained before the volatilization step is not particularly limited. For example, the amount is preferably 1000 g or less, more preferably 100 g or less, still more preferably 10 g or less, most preferably 1 g or less, relative to 100 g of the fluorosulfonylimide salt represented by general formula (1). When the amount of the residual solvent is large, it is undesirable because the amount of the electrolyte solution solvent to be used is also increased and the time required for the volatilization is prolonged. In the case where a solution produced by the production and purification of the fluorosulfonylimide salt represented by general formula (1) in a solution is used in the volatilization step, it is preferred to distil away the solvent prior to the volatilization step (i.e., prior to the addition of the electrolyte solution solvent) to reduce the amount of the contained residual solvent so as to adjust the amount of the residual solvent to a value falling within the above-mentioned range.

In the method for producing the electrolyte solution material according to the present invention, the lower limit of the amount of the electrolyte solution solvent to be used is not particularly limited, and can be adjusted appropriately depending on the amount of the residual solvent and the like. For example, the amount is preferably not more than 10000 g, more preferably 1000 g or less, still more preferably 500 g or less, still more preferably 200 g or less, still more preferably 100 g or less, most preferably 50 g or less, relative to 100 g of the fluorosulfonylimide salt represented by general formula (1).

In the method for producing the electrolyte solution material according to the present invention, the amount of the electrolyte solvent to be used is, for example, preferably 1 to 1000 parts by mass, more preferably 5 to 500 parts by mass, still more preferably 10 to 300 parts by mass, particularly preferably 30 to 200 parts by mass, more particularly preferably 50 to 100 parts by mass, relative to 100 parts by mass of the fluorosulfonylimide salt represented by general formula (1).

The volatilization step may be any one as long as a step of decompressing and/or heating the fluorosulfonylimide salt represented by general formula (1) and the electrolyte solution solvent is involved therein, and can be performed under ambient pressure or a reduced pressure. From the viewpoint of avoiding the decomposition of the fluorosulfonylimide salt by heat, it is desirable to perform the volatilization step under a reduced pressure. The degree of reduction in pressure is not particularly limited, and can be adjusted appropriately depending on the types of the residual solvent and the types of the electrolyte solution solvent. For example, the degree of reduction in pressure is preferably 200 kPa or less, more preferably 40 kPa or less, still more preferably 15 kPa or less, particularly preferably 5 kPa or less.

The volatilization temperature is not particularly limited, and can be adjusted appropriately depending on the degree of reduction in pressure, the types of the residual solvent and the types of the electrolyte solution solvent. From the viewpoint of avoiding the decomposition of the fluorosulfonylimide salt by heat, it is desirable to perform the volatilization step at a relatively low temperature. For example, the volatilization temperature is preferably 10 to 110° C., more preferably 15 to 80° C., still more preferably 20 to 60° C., particularly preferably 30 to 50° C.

The time for the volatilization is not particularly limited, and can be adjusted appropriately depending on the degree of reduction in pressure, the heating temperature, the amount of the residual solvent and the like. For example, the time for the volatilization is preferably 0.1 to 24 hours, more preferably 0.5 to 12 hours, still more preferably 1 to 8 hours, particularly preferably 2 to 5 hours.

The device to be used for the volatilization step and capable of achieving the decompression and/or heating may be selected appropriately depending on the volume of the solution, the degree of reduction in pressure, the heating temperature and the like. For example, a tank-type reactor and a tank-type reactor which is capable of reducing an internal pressure can be mentioned.

The concentration of the fluorosulfonylimide salt represented by general formula (1) to be contained in the electrolyte solution material is not limited particularly, and can be adjusted appropriately depending on the types of the electrolyte solvent. For example, the concentration is preferably 15 to 95% by mass, more preferably 20 to 90% by mass, still more preferably 30 to 90% by mass. In the production of a non-aqueous electrolyte solution by adding the organic solvent to the electrolyte solution material, from the viewpoint of appropriately setting the concentration of the electrolyte salt in the non-aqueous electrolyte solution, the concentration of the fluorosulfonylimide salt represented by general formula (1) to be contained in the electrolyte solution material is preferably 30% by mass or more, more preferably 40% by mass or more, still more preferably 50% by mass or more. When the electrolyte solution material according to the present invention contains the fluorosulfonylimide salt represented by general formula (1) at a concentration of not less than 30% by mass, good stability can be achieved and the generation of HF (hydrofluoric acid), which can cause the corrosion of a container for storage or transport use, can be prevented, and therefore this concentration is also suitable for the storage and transport of the fluorosulfonylimide salt represented by general formula (1).

As the electrolyte solvent to be contained in the electrolyte solution material according to the present invention, those electrolyte solvents which are mentioned specifically above can be used. It is preferred to contain a cyclic carbonate, such as ethylene carbonate, propylene carbonate and butylene carbonate, or a cyclic ester-based solvent, such as γ-butyrolactone and γ-valerolactone. Among these solvents, ethylene carbonate or γ-butyrolactone is preferably contained, and ethylene carbonate is particularly preferred. It is preferred to contain the cyclic carbonate or the cyclic ester-based solvent in an amount of 90% by mass or more, more preferably 95% by mass or more, still more preferably 98% by mass or more, relative to the total amount of the electrolyte solvents.

The amount of the residual solvent in the electrolyte solution material is not particularly limited, and can be appropriately adjusted depending on the concentration of the electrolyte solution material and the types of the residual solvent. For example, the amount is preferably not more than 3000 ppm, more preferably 2000 ppm or less, still more preferably 1000 ppm or less, particularly preferably 500 ppm or less, most preferably 200 ppm or less. When the remaining amount of the fluorosulfonylimide salt production solvent in the electrolyte solution falls within the above-mentioned range, the amount of the solvent in the resultant non-aqueous electrolyte solution can be reduced. Therefore, in a battery produced using the non-aqueous electrolyte solution, the occurrence of any side reaction upon the actuation of the battery can be prevented, thereby the swelling of the battery is suppressed.

After the completion of the volatilization step, the product may be subjected to filtration, a column chromatography, purification, an activated carbon treatment, a molecular sieve treatment or the like, if necessary.

The electrolyte solution material produced by the production method according to the present invention can be used suitably as a material for an ionic conductor that constitutes a primary battery, a battery having a charge/discharge mechanism, such as a lithium ion secondary battery and a fuel cell or an electrical storage device (an electrochemical device) such as an electrolytic capacitor, an electric double-layer capacitor and a solar cell, and an electrochromic display element.

The present invention also includes, within the scope thereof; a non-aqueous electrolyte solution produced using the electrolyte solution material; and a method for producing a non-aqueous electrolyte solution using the electrolyte solution material. A non-aqueous electrolyte solution can be produced by mixing a non-aqueous electrolyte solution preparation solvent with the electrolyte solution material, if necessary. In the non-aqueous electrolyte solution, various types of electrolytes, additives and the like may be added for the purpose of improving battery properties. It is also possible to add a solvent suitable for the dissolution of an electrolyte or the like to the electrolyte solution material. In the preset invention, the non-aqueous electrolyte can be prepared by adding a desired solvent to the electrolyte solution material.

The electrolyte solution preparation solvent to be used is not particularly limited, as long as the solvent is compatible with the electrolyte solvent and can dissolve and disperse a desired electrolyte salt therein. In the present invention, any one of the conventional known solvents that can be used in batteries, such as a non-aqueous solvent and a medium (e.g., a polymer, a polymer gel) that can be used in place of the solvent, can be used. In the electrolyte solution material, the electrolyte solvent is contained. If required, the electrolyte solution material may additionally be added a solvent that is of the same type as the electrolyte solvent, and any one of the above-mentioned electrolyte solvents may be used as the solvent. The electrolyte solution preparation solvent may be in a liquid form or a solid form, and is preferably in a liquid form from the viewpoint of the achievement of highly efficient mixing. The temperature of the electrolyte solution preparation solvent is not particularly limited. The temperature may be room temperature, and may be adjusted appropriately as required.

Among the electrolyte solution preparation solvents, a carbonate ester (a carbonate-based solvent) such as a linear carbonate ester and a cyclic carbonate ester, a lactone and an ether are preferred; dimethyl carbonate, ethylmethyl carbonate, diethyl carbonate, ethylene carbonate, propylene carbonate, γ-butyrolactone, γ-valerolactone and the like are more preferred; and a carbonate-based solvent such as dimethyl carbonate, ethylmethyl carbonate, diethyl carbonate, ethylene carbonate and propylene carbonate is still more preferred. These solvents may be used singly, or two or more of them may be used in combination.

In the present invention, if necessary, an electrolyte salt that is different from the fluorosulfonylimide salt (1) (also referred to as "another electrolyte salt", hereinafter) may be mixed with the electrolyte solution material. The above-mentioned another electrolyte salt may be added to the electrolyte solution material to which the electrolyte solution preparation solvent is not added yet. From the viewpoint of the dissolution efficiency of the above-mentioned another electrolyte salt, it is desirable to add the above-mentioned another electrolyte salt after the addition of the electrolyte solution preparation solvent to the electrolyte solution material. For example, in the case where the above-mentioned another electrolyte salt to be added is poorly soluble in ethylene carbonate, like LiPF$_6$, it is desirable to add the electrolyte salt after the addition of a solvent suitable for the dissolution of the electrolyte salt, as the electrolyte solution preparation solvent, to the electrolyte solution material.

The above-mentioned another electrolyte salt is not particularly limited, and may be any one of the conventional known electrolytes that may be used in electrolytes for lithium ion secondary batteries. As another electrolyte salt, such an electrolyte salt is exemplified by an inorganic cation salt and organic cation salt of trifluoromethanesulfonate ion (CF$_3$SO$_3^-$), hexafluorophosphate ion (PF$_6^-$), perchlorate ion (ClO$_4^-$), tetrafluoroborate ion (BF$_4^-$), hexafluoroarsenate ion (AsF$_6^-$), tetracyanoborate ion ([B(CN)$_4$]$^-$), tetrachloroaluminum ion (AlCl$_4^-$), tricyanomethide ion (C[(CN)$_3$]$^-$), dicyanamide ion (N[(CN)$_2$]$^-$), tris(trifluoromethanesulfonyl)methide ion (C[(CF$_3$SO$_2$)$_3$]$^-$), hexafluoroantimonate ion (SbF$_6^-$) and dicyanotriazolate ion (DCTA) as an anion. Specific examples include LiPF$_6$, LiPF$_3$(C$_2$F$_5$)$_3$, LiBF$_4$, LiBF(CF$_3$)$_3$, preferably LiPF$_6$ or LiBF$_4$, and more preferably LiPF$_6$. When the electrolyte solution preparation solvent and the above-mentioned another electrolyte salt are mixed with the electrolyte solution material according to the present invention to produce the non-aqueous electrolyte solution, the generation of heat during the mixing of the electrolyte salt can be prevented, and therefore the decomposition of the non-aqueous electrolyte solution can be prevented, resulting in the production of the electrolyte solution having good quality.

The non-aqueous electrolyte solution according to the present invention may contain an additive for improving various properties of a lithium ion secondary battery. The additive may be added at any stage in the process of the production of the non-aqueous electrolyte solution, and the stage is not limited particularly. For example, the additive can be added after the addition of the electrolyte salt.

The present invention also includes, within the scope thereof: a method for storing the electrolyte solution material according to the present invention; and a method for transporting the electrolyte solution material according to the present invention. The electrolyte solution material according to the present invention contains the fluorosulfonylimide salt represented by general formula (1) and the electrolyte solvent, wherein the concentration of the fluorosulfonylimide salt represented by general formula (1) is 30% by mass or more. In this case, good stability can be achieved and the generation of HF (hydrofluoric acid), which can cause the corrosion of a container for storage or transport use, can be prevented. Therefore, the electrolyte solution material is also suitable for the storage and transport of the fluorosulfonylimide salt represented by general formula (1). The concentration of the fluorosulfonylimide salt represented by general formula (1) in the electrolyte solution material is preferably 35% by mass or more, more preferably 40% by mass or more, still more preferably not less than 50% by mass or more. The upper limit of the concentration is preferably 95% by mass or less, more preferably 90% by mass or less. If the concentration of the fluorosulfonylimide salt represented by general formula (1) in the electrolyte solution material is less than 30% by mass, the fluorosulfonylimide salt is decomposed to generate an acid such as HF, leading to the corrosion of a container or the deterioration of the electrolyte solution material.

The container to be used for the storage or transport of the electrolyte solution material according to the present invention is not particularly limited with respect to the form thereof, including the size, material and the like thereof, and the conventionally known knowledge can apply arbitrary to the container. In the case where a small amount of the electrolyte solution material synthesized at a laboratory level is to be stored, a small storage container may be used. In the case where a large amount of the electrolyte solution material synthesized at an industrial level is to be stored, a large storage container may be used.

As the material for the storage container, a metallic material, such as stainless steel and hastelloy, and a fluorine-based resin, such as polytetrafluoroethylene (PTFE), and the like can be employed. Among these materials, from the viewpoint of having a high pressure-resisting capacity, it is preferred that the container is made from stainless steel. In order to further improve the corrosion resistance of the storage container, it is preferred to coat the inner surface of a container that is made from a material such as the above-mentioned metal with a resin. In this case, the resin to be used for the coating is not particularly limited. Specific examples of the resin include: a fluorine-based resin, such as polytetrafluoroethylene (PTFE), a tetrafluoroethylene-perfluoroalkyl vinyl ether copolymer (PFA) and a tetrafluoroethylene-hexafluoropropylene copolymer (FEP); and an olefin-based resin, such as polypropylene. From the viewpoint of achieving an excellent corrosion resistance improving effect, it is preferred to coat with PTFE. The coating thickness of the resin coating is not particularly limited, and is preferably 10 to 3000 μm, more preferably 500 to 1000 μm. It is also preferred for the storage container to be hermetically sealable. An example of the means for enabling the hermetic sealing of the container is an embodiment in which a valve is provided at a part of the container.

The present application claims the benefit of the priority dates of Japanese patent application No. 2014-204815 filed on Oct. 3, 2014, and Japanese patent application No. 2015-118065 filed on Jun. 11, 2015. All of the contents of the Japanese patent application No. 2014-204815 filed on Oct. 3, 2014, and Japanese patent application No. 2015-118065 filed on Jun. 11, 2015, are incorporated by reference herein.

EXAMPLES

Hereinafter, the present invention is described in detail with Examples. However, the present invention is not limited to the following Examples in any way, and it is possible to carry out the present invention according to the Examples with an additional appropriate change within the range of the above descriptions and the following descriptions. Such a change is also included in the technical scope of the present invention.

[Amount of Residual Solvent]

A measurement solution was prepared by adding 200 μl of an aqueous dimethyl sulfoxide solution (dimethyl sulfoxide/ultrapure water=20/80 by volume) and 2 ml of a 20 mass % aqueous sodium chloride solution to 0.05 g of an electrolyte solution material. The measurement solution was placed in a vial bottle, and the vial bottle was hermetically sealed. The amount of a residual solvent contained in the electrolyte solution material was measured with a headspace gas chromatography system ("Agilent6890", manufactured by Agilent).

Device: Agilent 6890
Column: HP-5 (length: 30 m, column inner diameter: 0.32 mm, film thickness: 0.25 μm) (manufactured by Agilent)
Column temperature conditions: 60° C. (retained for 2 minutes), temperature was raised to 300° C. at 30° C./min, 300° C. (retained for 2 minutes)

Headspace conditions: 80° C. (retained for 30 minutes)
Injector temperature: 250° C.
Detector: FID (300° C.)

Production Example 1: Production of Lithium di(fluorosulfonyl)imide (LiFSI)

Into a 500-mL PFA-made reaction container equipped with a stirrer and a condenser, 120 g of butyl acetate was introduced. Subsequently, 16.1 g of di(chlorosulfonyl)imide (75 mmol) was further introduced into the reaction container. The resultant solution was stirred to dissolve the compounds. To the resultant di(chlorosulfonyl)imide solution, 4.45 g of ammonium chloride (82.5 mmol) was added, and the solution was stirred at 80° C. for 1 hour. Acidic ammonium fluoride $NH_4F.HF$ (20.53 g) (360 mmol) was added to the di(chlorosulfonyl)imide solution, and the resultant solution was further stirred at 80° C. for 4 hours.

After the completion of the reaction, the reaction solution was cooled to room temperature, and then a solid material was removed by filtration. The filtrate was transferred to a separating funnel, then an aqueous solution prepared by dissolving 3.15 g (75 mmol) of lithium hydroxide monohydrate in 21 g of ultrapure water was added thereto, and the resultant solution was agitated. After the resultant solution was allowed to stand, an aqueous layer was removed. An aqueous solution prepared by dissolving 1.57 g (37 mmol) of lithium hydroxide monohydrate in 11 g of ultrapure water was added again to the resultant solution, and the solution was stirred. After the resultant solution was allowed to stand, an aqueous layer was removed.

As an organic layer, 128 g of a solution containing 10 g of lithium di(fluorosulfonyl)imide was obtained. The obtained solution was heated at 50° C. and 1.5 kPa for 1 hour to volatilize butyl acetate, thereby producing 30 g of a solution composed of 10 g of lithium di(fluorosulfonyl) and 20 g of butyl acetate. By the use of a $^{19}F$-NMR (solvent: deuterated acetonitrile) measurement, the amount of lithium di(fluorosulfonyl)imide contained in the organic layer was determined from the amount of trifluoromethylbenzene, which was added as an internal standard substance, and the comparison between an integral value of a peak derived from the internal standard substance and an integral value of a peak derived from the desired product.

Example 1

A lithium di(fluorosulfonyl)imide powder (4.99 g) containing butyl acetate (208 ppm) and dichloromethane (4621 ppm), which was prepared separately, and diethyl carbonate (7.56 g) were placed in a 50-ml eggplant flask, and the mixture was dissolved. The solution was decompressed at 25° C. and 1 kPa for 3 hours to volatilize the solvent. In this manner, 11.64 g diethyl carbonate solution of lithium di(fluorosulfonyl)imide was produced as an electrolyte solution material. The solution thus produced contained butyl acetate at a concentration of 83 ppm, but the presence of dichloromethane was not confirmed. Dichloromethane, which had low affinity for lithium di(fluorosulfonyl)imide, was reduced through the volatilization step.

Example 2

In a 25-ml eggplant flask, ethylene carbonate (EC) (4.76 g) was added to a lithium di(fluorosulfonyl)imide powder (3.23 g) containing butyl acetate (208 ppm) and dichloromethane (4621 ppm), thereby the mixture was dissolved. The solution was decompressed at 25° C. and 1 kPa for 3 hours to volatilize the solvent. In this manner, 7.83 g of an ethylene carbonate solution of lithium di(fluorosulfonyl) imide was produced as an electrolyte solution material. It was confirmed that the solution thus produced contained 85 ppm of butyl acetate and 40 ppm of dichloromethane.

Example 3

Into a 100-ml eggplant flask, a solution prepared by dissolving 10 g of lithium di(fluorosulfonyl)imide in 20 g of butyl acetate and 20 g of ethylene carbonate were introduced. The solution was heated and decompressed at 60° C. and 1.5 kPa for 8 hours to volatilize the solvent. In this manner, 28 g of a solution of lithium di(fluorosulfonyl)imide in ethylene carbonate was produced as an electrolyte solution material. It was confirmed that the solution thus produced contained 60 ppm of butyl acetate. Butyl acetate, which had moderate affinity for lithium di(fluorosulfonyl) imide, was reduced through the volatilization step.

Examples 4-1 to 7-5

The same procedure as in Example 3 was carried out, except that the solvent to be contained in the di(fluorosulfonyl)imide solution, the electrolyte solution solvent, the temperature of the solution, the degree of reduction in pressure and the heating time were changed as shown in Tables 1 to 4. In this manner, electrolyte solution materials each containing di(fluorosulfonyl)imide were produced. The amounts of the residual solvents in the individual solutions are shown in the tables.

Examples 8-1 to 8-3

The same procedure as in Example 3 was carried out, except that a solution composed of 10 g of lithium di(fluorosulfonyl)imide produced in Production Example 1 and 20 g of butyl acetate was used and the temperature of the solution, the degree of reduction in pressure and the heating time were changed as shown in Table 5. In this manner, electrolyte solution materials each containing di(fluorosulfonyl)imide were produced. The amounts of the residual solvents in the individual solutions are shown in the table.

Examples 9-1 to 13-5

The same procedure as in Example 3 was carried out, except that the solvent to be contained in the di(fluorosulfonyl)imide solution, the electrolyte solution solvent, the temperature of the solution, the degree of reduction in pressure and the heating time were changed as shown in Tables 6 to 10. In this manner, electrolyte solution materials each containing di(fluorosulfonyl)imide were produced. The amounts of the residual solvents in the individual solutions are shown in the tables.

TABLE 1

| | Example | | | | | |
|---|---|---|---|---|---|---|
| | 4-1 | 4-2 | 4-3 | 4-4 | 4-5 | 4-6 |
| Solvent | Acetonitrile | Acetonitrile | Acetonitrile | Acetonitrile | Acetonitrile | Acetonitrile |
| Solvent weight/g | 20 | 20 | 20 | 20 | 20 | 10 |
| Electrolyte solution solvent | Propylene carbonate | Ethylene carbonate | γ-butyloractone | Diethyl carbonate | Ethyl methyl carbonate | Dimethyl carbonate |
| Used amount of electrolyte solution solvent | 20 | 20 | 20 | 20 | 20 | 20 |
| Heating temperature/° C. | 50 | 50 | 50 | 50 | 50 | 40 |
| Degree of reduction in pressure/kPa | 1.5 | 1.5 | 1.5 | 1.5 | 3 | 3 |
| Heateing time/hr | 4 | 4 | 4 | 4 | 3 | 2 |
| Yield of electrolyte solution material/g | 29.9 | 29.8 | 28 | 34 | 33 | 21 |
| Residual solvent/ppm | 30 | 30 | 40 | 290 | 610 | 1900 |

TABLE 2

| | Example | | |
|---|---|---|---|
| | 5-1 | 5-2 | 5-3 |
| Solvent | Benzonitrile | Benzonitrile | Benzonitrile |
| Solvent weight/g | 20 | 20 | 20 |
| Electrolyte solution solvent | Propylene carbonate | Ethylene carbonate | γ-butyloractone |
| Used amount of electrolyte solution solvent | 20 | 20 | 20 |
| Heating temperature/° C. | 100 | 100 | 100 |
| Degree of reduction in pressure/kPa | 1.5 | 1.5 | 1.5 |
| Heateing time/hr | 8 | 8 | 8 |
| Yeild of electrolyte solution material/g | 32 | 32 | 30 |
| Residual solvent/ppm | 630 | 630 | 630 |

TABLE 3

| | Example | | | | | | |
|---|---|---|---|---|---|---|---|
| | 6-1 | 6-2 | 6-3 | 6-4 | 6-5 | 6-6 | 6-7 |
| Solvent | Ethyl acetate | Ethyl acetate | Ethyl acetate | Ethyl acetate | Ethyl acetate | Ethyl acetate | Ethyl acetate |
| Solvent weight/g | 20 | 20 | 20 | 20 | 20 | 20 | 20 |
| Electrolyte solution solvent | Propylene carbonate | Ethylene carbonate | γ-butyloractone | Diethyl carbonate | Ethyl methyl carbonate | Diethyl carbonate | 1,2-dimethoxyethane |
| Used amount of electrolyte solution solvent | 20 | 20 | 20 | 20 | 20 | 20 | 20 |
| Heating temperature/° C. | 40 | 40 | 40 | 40 | 40 | 40 | 40 |
| Degree of reduction in pressure/kPa | 1.5 | 1.5 | 1.5 | 1.5 | 1.5 | 1.5 | 1.5 |
| Heateing time/hr | 8 | 8 | 8 | 6 | 3 | 3 | 2 |
| Yield of electrolyte solution material/g | 30 | 30.1 | 29.5 | 30.5 | 30.5 | 27.5 | 23 |
| Residual solvent/ppm | 50 | 50 | 40 | 120 | 330 | 360 | 560 |

TABLE 4

| | Example | | | | |
|---|---|---|---|---|---|
| | 7-1 | 7-2 | 7-3 | 7-4 | 7-5 |
| Solvent | Isopropyl acetate | Isopropyl acetate | Isopropyl acetate | Isopropyl acetate | Isopropyl acetate |
| Solvent weight/g | 20 | 20 | 20 | 20 | 20 |
| Electrolyte solution solvent | Propylene carbonate | Ethylene carbonate | γ-butyloractone | Diethyl carbonate | Ethyl methyl carbonate |
| Used amount of electrolyte solution solvent | 20 | 20 | 20 | 20 | 20 |
| Heating temperature/° C. | 40 | 40 | 40 | 40 | 40 |
| Degree of reduction in pressure/kPa | 3 | 3 | 3 | 30 | 30 |
| Heating time/hr | 8 | 8 | 8 | 6 | 2 |
| Yield of electrolyte solution material/g | 29.7 | 29.8 | 28 | 30.3 | 28 |
| Residual solvent/ppm | 10 | 10 | 20 | 330 | 980 |

TABLE 5

| | Example | | |
|---|---|---|---|
| | 8-1 | 8-2 | 8-3 |
| Solvent | Butyl acetate | Butyl acetate | Butyl acetate |
| Solvent weight/g | 20 | 20 | 20 |
| Electrolyte solution solvent | Propylene carbonate | Ethylene carbonate | γ-butyloractone |
| Used amount of electrolyte solution solvent | 20 | 20 | 20 |
| Heating temperature/° C. | 60 | 60 | 60 |
| Degree of reduction in pressure/kPa | 1.5 | 1.5 | 1.5 |
| Heateing time/hr | 8 | 8 | 8 |
| Yeild of electrolyte solution material/g | 28 | 28 | 27 |
| Residual solvent/ppm | 40 | 60 | 80 |

TABLE 6

| | Example | | | | | | | |
|---|---|---|---|---|---|---|---|---|
| | 9-1 | 9-2 | 9-3 | 9-4 | 9-5 | 9-6 | 9-7 | 9-8 |
| Solvent | Diethyl ether | Diethyl ether | Diethyl ether | Diethyl ether | Diethyl ether | Diethyl ether | Diethyl ether | Diethyl ether |
| Solvent weight/g | 20 | 20 | 20 | 20 | 20 | 20 | 20 | 20 |
| Electrolyte solution solvent | Propylene carbonate | Ethylene carbonate | γ-butyloractone | Diethyl carbonate | Ethyl methyl carbonate | Dimthyl carbonate | 1,2-dimethoxyetha | Methyl propionate |
| Used amount of electrolyte solution solvent | 20 | 20 | 20 | 20 | 20 | 20 | 20 | 20 |
| Heating temperature/° C. | 35 | 35 | 35 | 35 | 35 | 35 | 35 | 35 |
| Degree of reduction in pressure/kPa | 15 | 15 | 15 | 15 | 15 | 15 | 15 | 15 |
| Heateing time/hr | 4 | 4 | 4 | 4 | 4 | 4 | 4 | 4 |
| Yeild of electrolyte solution material/g | 30 | 30 | 30 | 30 | 30 | 30 | 30 | 30 |
| Residual solvent/ppm | 0 | 0 | 0 | 0 | 0 | 0 | 0 | 0 |

TABLE 7

| | Example | | | | | | | |
|---|---|---|---|---|---|---|---|---|
| | 10-1 | 10-2 | 10-3 | 10-4 | 10-5 | 10-6 | 10-7 | 10-8 |
| Solvent | Diisopropyl ether | Diisopropyl ether | Diisopropyl ether | Diisopropyl ether | Diisopropyl ether | Diisopropyl ether | Diisopropyl ether | Diethyl ether |
| Solvent weight/g | 20 | 20 | 20 | 20 | 20 | 20 | 20 | 20 |
| Electrolyte solution solvent | Propylene carbonate | Ethylene carbonate | γ-butyloractone | Diethyl carbonate | Ethyl methyl carbonate | Dimthyl carbonate | 1,2-dimethoxyethane | Methyl propionate |
| Used amount of electrolyte solution solvent | 20 | 20 | 20 | 20 | 20 | 20 | 20 | 20 |
| Heating temperature/° C. | 45 | 45 | 45 | 45 | 45 | 45 | 45 | 45 |
| Degree of reduction in pressure/kPa | 5 | 5 | 5 | 5 | 5 | 5 | 5 | 5 |
| Heateing time/hr | 3 | 3 | 3 | 3 | 3 | 3 | 3 | 3 |
| Yeild of electrolyte solution material/g | 30 | 30 | 30 | 29.5 | 29.3 | 28 | 25 | 24 |
| Residual solvent/ppm | 20 | 20 | 20 | 150 | 300 | 1500 | 2000 | 2500 |

TABLE 8

| | Example | | | | | | | |
|---|---|---|---|---|---|---|---|---|
| | 11-1 | 11-2 | 11-3 | 11-4 | 11-5 | 11-6 | 11-7 | 11-8 |
| Solvent | t-butyl methyl ether | t-butyl methyl ether | t-butyl methyl ether | t-butyl methyl ether | t-butyl methyl ether | t-butyl methyl ether | t-butyl methyl ether | t-butyl methyl ether |
| Solvent weight/g | 20 | 20 | 20 | 20 | 20 | 20 | 20 | 20 |
| Electrolyte solution solvent | Propylene carbonate | Ethylene carbonate | γ-butyl-oractone | Diethyl carbonate | Ethyl methyl carbonate | Dimethyl carbonate | 1,2-dimethoxy-ethane | Methyl propionate |
| Used amount of electrolyte solution solvent | 20 | 20 | 20 | 20 | 20 | 20 | 20 | 20 |
| Heating temperature/° C. | 35 | 35 | 35 | 35 | 35 | 35 | 35 | 35 |
| Degree of reduction in pressure/kPa | 15 | 15 | 15 | 15 | 15 | 15 | 15 | 15 |

TABLE 8-continued

| | Example | | | | | | | |
|---|---|---|---|---|---|---|---|---|
| | 11-1 | 11-2 | 11-3 | 11-4 | 11-5 | 11-6 | 11-7 | 11-8 |
| Heateing time/hr | 4 | 4 | 4 | 4 | 4 | 4 | 4 | 4 |
| Yeild of electrolyte solution material/g | 30 | 30 | 30 | 30 | 30 | 30 | 30 | 30 |
| Residual solvent/ppm | 0 | 0 | 0 | 0 | 0 | 0 | 0 | 0 |

TABLE 9

| | Example | | | |
|---|---|---|---|---|
| | 12-1 | 12-2 | 12-3 | 12-4 |
| Solvent | Cyclopentyl methyl ether | Cyclopentyl methyl ether | Cyclopentyl methyl ether | Cyclopentyl methyl ether |
| Solvent weight/g | 20 | 20 | 20 | 20 |
| Electrolyte solution solvent | Propylene carbonate | Ethylene carbonate | γ-butyloractone | Diethyl carbonate |
| Used amount of electrolyte solution solvent | 20 | 20 | 20 | 20 |
| Heating temperature/° C. | 55 | 55 | 55 | 55 |
| Degree of reduction in pressure/kPa | 2.5 | 2.5 | 2.5 | 2.5 |
| Heateing time/hr | 3 | 3 | 3 | 3 |
| Yeild of electrolyte solution material/g | 30 | 30 | 30 | 28 |
| Residual solvent/ppm | 40 | 60 | 70 | 800 |

TABLE 10

| | Example | | | | |
|---|---|---|---|---|---|
| | 13-1 | 13-2 | 13-3 | 13-4 | 13-5 |
| Solvent | Nitromehtane | Nitromehtane | Nitromehtane | Nitromehtane | Nitromehtane |
| Solvent weight/g | 20 | 20 | 20 | 20 | 20 |
| Electrolyte solution solvent | Propylene carbonate | Ethylene carbonate | γ-butyloractone | Diethyl carbonate | Ethyl mehyl carbonate |
| Used amount of electrolyte solution solvent | 20 | 20 | 20 | 20 | 20 |
| Heating temperature/° C. | 55 | 55 | 55 | 55 | 55 |
| Degree of reduction in pressure/kPa | 2 | 2 | 2 | 2 | 2 |
| Heateing time/hr | 3 | 3 | 3 | 3 | 3 |
| Yeild of electrolyte solution material/g | 30 | 30 | 30 | 28 | 27 |
| Residual solvent/ppm | 50 | 40 | 70 | 800 | 900 |

Comparative Example 1

A lithium di(fluorosulfonyl)imide powder (5 g) containing 208 ppm of butyl acetate and 4621 ppm of dichloromethane was spread on a petri dish and then dried in a vacuum drier at 60° C. and 1 kPa for 12 hours. However, the amounts of the residual solvents were not reduced.

Comparative Example 2

A lithium di(fluorosulfonyl)imide powder (5 g) containing 208 ppm of butyl acetate and 4621 ppm of was ground with a mortar. The ground product was spread on a petri dish and was then dried in a vacuum drier at 60° C. and 1 kPa for 12 hours. However, the amounts of the residual solvents were not reduced.

Example 15-1

A lithium di(fluorosulfonyl)imide powder (5.00 g) containing 208 ppm of butyl acetate and 4621 ppm of dichloromethane which were residual solvents was introduced into a 50-ml eggplant flaks. EC (5.10 g) was further added to the powder, thereby the mixture was dissolved. The solution was heated at 60° C. and 1 kPa for 3 hours to volatilize the solvent. In this manner, an electrolyte solution material composed of 5.00 g of LiFSI and 5.00 g of EC was produced.

The amounts of the residual solvents immediately after the production of the electrolyte solution material were as follows: butyl acetate: 55 ppm, dichloromethane: 5 ppm, water: 20 ppm, and HF: 4 ppm. The electrolyte solution material was stored in a stainless steel-made container at 60° C. for 30 days. The amount of HF in the electrolyte solution material after the storage was 8 ppm. This fact means that 4 ppm of HF was generated during storage. This amount was converted to an amount per mass of lithium di(fluorosulfonyl)imide (LiFSI), and the converted amount was 8 ppm/LiFSI-kg.

The determination of amount of HF was carried out using an automatic titrator manufactured by Metrohm. Specifically, neutralization titration was carried out with a 0.01-N sodium hydroxide/methanol solution using a solvotrode electrode for non-aqueous media. The conversion of the amount of the acid was carried out in terms of HF.

Example 15-2

Into a 50-ml eggplant flaks, 5.00 g of a lithium di(fluorosulfonyl)imide powder containing butyl acetate (208 ppm) and dichloromethane (4621 ppm) which were residual solvents was introduced. EC (1.98 g) was further added to the powder, thereby the mixture was dissolved. The solution was heated at 60° C. and 1 kPa for 3 hours to volatilize the solvent. In this manner, a solution composed of 5.00 g of LiFSI and 1.78 g of EC was produced. Subsequently, 3.22 g of ethyl methyl carbonate (EMC) was added to the solution to produce an electrolyte solution material. The amounts of the residual solvents in the electrolyte solution material immediately after the preparation were as follows: butyl acetate: 45 ppm, and dichloromethane: 6 ppm. Subsequently, the amounts of HF and others before and after the storage were determined in the same manner as in Example 15-1.

Example 15-3

Into a 50-ml eggplant flaks, 5.00 g of a lithium di(fluorosulfonyl)imide powder containing 208 ppm of butyl acetate and 4621 ppm of dichloromethane which were residual solvents was introduced. EC (4.50 g) was further added to the powder, thereby the mixture was dissolved. The solution was heated at 60° C. and 1 kPa for 3 hours to volatilize the solvent. In this manner, a solution composed of 5.00 g of LiFSI and 4.40 g of EC was produced. Subsequently, 0.6 g of ethyl methyl carbonate (EMC) was added to the solution to produce an electrolyte solution material. The amounts of the residual solvents in the electrolyte solution material immediately after the preparation were as follows: butyl acetate: 43 ppm, and dichloromethane: 5 ppm. Subsequently, the amounts of HF and others before and after the storage were determined in the same manner as in Example 15-1.

Example 15-4

Into a 50-ml eggplant flaks, 5.00 g of a lithium di(fluorosulfonyl)imide powder containing 208 ppm of butyl acetate and 4621 ppm of dichloromethane which were residual solvents was introduced. γ-Butyrolactone (GBL, 5.20 g) was further added to the powder, thereby the mixture was dissolving the powder in GBL. The solution was heated at 60° C. and 1 kPa for 3 hours to volatilize the solvent. In this manner, a solution composed of 5.00 g of LiFSI and 5.00 g of GBL was produced. The amounts of the residual solvents in the electrolyte solution material immediately after the preparation were as follows: butyl acetate: 85 ppm, and dichloromethane: 9 ppm. Subsequently, the amounts of HF and others before and after the storage were determined in the same manner as in Example 15-1.

Example 15-5

Into a 50-ml eggplant flaks, 6.20 g of a lithium di(fluorosulfonyl)imide powder 208 ppm of containing butyl acetate and 4621 ppm of dichloromethane which were residual solvents was introduced. Further, 4.00 g of EC was added to the powder, thereby the mixture was dissolved. The solution was heated at 60° C. and 1 kPa for 3 hours to volatilize the solvent. In this manner, a solution composed of 6.20 g of LiFSI and 3.80 g of EC was produced. The amounts of the residual solvents in the electrolyte solution material immediately after the preparation were as follows: butyl acetate: 78 ppm, and dichloromethane: 7 ppm. Subsequently, the amounts of HF and others before and after the storage were determined in the same manner as in Example 15-1.

Example 15-6

Into a 50-ml eggplant flaks, 6.20 g of a lithium di(fluorosulfonyl)imide powder containing 208 ppm of butyl acetate and 4621 ppm of dichloromethane which were residual solvents was introduced. Further, 1.50 g of EC was added to the powder, thereby the mixture was dissolved. The solution was heated at 60° C. and 1 kPa for 3 hours to volatilize the solvent. In this manner, a solution composed of 6.20 g of LiFSI and 1.35 g of EC was produced. Subsequently, 2.45 g of ethyl methyl carbonate (EMC) was added to the solution to produce an electrolyte solution material. The amounts of the residual solvents in the electrolyte solution material immediately after the preparation were as follows: butyl acetate: 95 ppm, and dichloromethane: 10 ppm. Subsequently, the amounts of HF and others before and after the storage were determined in the same manner as in Example 15-1.

Reference Example 1

A solution composed of 5.00 g of LiFSI and 5.00 g of EC was produced in the same manner as in Example 15-1. EC was further added to the powder, thereby producing an EC solution containing 10.2% by mass of LiFSI. The amounts of the residual solvents in the solution were as follows: butyl acetate: 13 ppm, and dichloromethane: 2 ppm. The amounts of HF and others before and after the storage were determined in the same manner as in Example 15-1.

Reference Example 2

A solution composed of 5.00 g of LiFSI, 1.78 g of EC and 3.22 g of EMC was produced in the same manner as in Example 15-2. Further, 25.12 g of EC was added to the powder, thereby producing an EC solution containing 10.2% by mass of LiFSI. The amounts of the residual solvents in the solution were as follows: butyl acetate: 14 ppm, and dichloromethane: 1 ppm. The amounts of HF and others before and after the storage were determined in the same manner as in Example 15-1.

TABLE 11

|  | Unit | Experimental example | | | | | | Reference example | |
| --- | --- | --- | --- | --- | --- | --- | --- | --- | --- |
|  |  | 15-1 | 15-2 | 15-3 | 15-4 | 15-5 | 15-6 | 1 | 2 |
| EC | mass % | 50 |  |  |  | 38 |  | 89.8 |  |
| EC/EMC = 85/15 | mass % |  |  | 50 |  |  |  |  |  |
| EC/EMC = 3/7 | mass % |  | 50 |  |  |  | 38 |  | 89.8 |
| GBL | mass % |  |  |  | 50 |  |  |  |  |
| LiFSI | mass % | 50 | 50 | 50 | 50 | 62 | 62 | 10.2 | 10.2 |
| Initial concentration of HF | ppm | 4 | 5 | 5 | 4 | 6 | 5 | 4 | 5 |
| HF concentration after storage at 60° C. for 30 | ppm | 8 | 10 | 10 | 8 | 10 | 9 | 16 | 17 |
| Increasing amount of HF | ppm | 4 | 5 | 5 | 4 | 4 | 4 | 12 | 12 |
| HF amount per mass of LiFSI | ppm/LiFSI-kg | 8 | 9 | 9 | 8 | 7 | 6 | 74 | 79 |
| Residual solvent Butyl acetate | ppm | 55 | 45 | 43 | 85 | 78 | 95 | 13 | 14 |
| Residual solvent Diclrolomethane | ppm | 5 | 6 | 5 | 9 | 7 | 10 | 2 | 1 |

As shown in Table 11, in each of Reference Examples, when compared with Examples 15-1 to 15-6 in each of which the concentration of LiFSI in the electrolyte solution material was not less than 50% by mass, it was demonstrated that the concentration of LiFSI in the electrolyte solution material was 10.2% by mass but the amount of HF generated during the storage was significant. Consequently, it was confirmed that all of the electrolyte solution materials according to the present invention, each containing LiFSI in an amount not less than a specific amount, had an effect of inhibiting the generation of HF during storage.

Example A-1

The same procedure as in Example 2 was carried out, except that the amount of ethylene carbonate used in Example 2 was changed to 4.60 g. In this manner, an electrolyte solution material was produced. Further, 2.62 g of $LiPF_6$, 5.69 g of EC and 18.40 g of ethyl methyl carbonate (EMC) were added to the electrolyte solution material to produce a non-aqueous electrolyte solution which contained 9.3% by mass (0.6 M) of lithium di(fluorosulfonyl)imide and 67.5% by mass (0.6 M) of $LiPF_6$ in an EC/EMC (=3/7 (by volume)) mixed solvent. The amounts of the residual solvents in the non-aqueous electrolyte solution were as follows: butyl acetate: 8 ppm, and dichloromethane: 4 ppm.

Example A-2

The same procedure as in Example A-1 was carried out, except that the conditions employed for volatilizing the residual solvents in Example A-1 were changed to 25° C., 40 kPa and 3 hours. In this manner, an electrolyte solution material was produced. The amounts of the residual solvents in the electrolyte solution material were as follows: butyl acetate: 96 ppm, and dichloromethane: 308 ppm. To the electrolyte solution material were further added $LiPF_6$, EC and EMC in the same amounts as in Example A-1. In this manner, a non-aqueous electrolyte solution was produced, which contained 9.3% by mass (0.6 M) of LiFSI and 67.5% by mass (0.6 M) of $LiPF_6$ in an EC/EMC (=3/7 (by volume)) mixed solvent. The amounts of the residual solvents in the non-aqueous electrolyte were as follows: butyl acetate: 9 ppm, and dichloromethane: 29 ppm.

Example A-3

The same procedure as in Example A-1 was carried out, except that the conditions employed for volatilizing the residual solvents in Example A-1 were changed to 25° C., 100 kPa and 3 hours. In this manner, an electrolyte solution material was produced. The amounts of the residual solvents in the electrolyte solution material were as follows: butyl acetate: 150 ppm, and dichloromethane: 1280 ppm. To the electrolyte solution material were further added $LiPF_6$, EC and EMC in the same amounts as in Example A-1. In this manner, a non-aqueous electrolyte solution was produced, which contained 9.3% by mass (0.6 M) of LiFSI and 67.5% by mass (0.6 M) of $LiPF_6$ in an EC/EMC (=3/7 (by volume)) mixed solvent. The amounts of the residual solvents in the non-aqueous electrolyte were as follows: butyl acetate: 19 ppm, and dichloromethane: 119 ppm.

Comparative Example A-1

The same procedure as in Example A-1 was carried out, except that the operation for volatilizing the residual solvents was not carried out. In this manner, an electrolyte solution material was produced. The amounts of the residual solvents in the electrolyte solution material are as follows: butyl acetate: 208 ppm, and dichloromethane: 4621 ppm. To the electrolyte solution material were further added $LiPF_6$, EC and EMC in the same amounts as in Example A-1. In this manner, a non-aqueous electrolyte solution was produced, which contained 9.3% by mass (0.6 M) of LiFSI and 67.5% by mass (0.6 M) of $LiPF_6$ in an EC/EMC (=3/7 (by volume)) mixed solvent. The amounts of the residual solvents in the non-aqueous electrolyte solution were as follows: butyl acetate: 17 ppm, and dichloromethane: 430 ppm.

As shown in Table 12, in each of Examples A-1 to A-3, the volume expansion of the battery after being stored at 60° C. for 1 month was about 0.03 to 0.06 ml. In Comparative Example A-1, in contrast, the result was 0.21 ml. It was confirmed that, in a battery which was provided with a non-aqueous electrolyte solution produced using an electrolyte solution material having a reduced residual solvent amount, the swelling of the battery was prevented during the charge-discharge operation of the battery.

Production of Laminate-Type Lithium Ion Secondary Battery

1. Production of Positive Electrode Sheet

A positive electrode active material ($LiCoO_2$), a conduction-assisting agent 1 (acetylene black, AB), a conduction-assisting agent 2 (graphite) and a binder (polyvinylidene fluoride, PVdF) were mixed together at a mixing ratio of 92:2:2:4 by mass. A positive electrode mix slurry, which was prepared by dispersing the mixture in N-methylpyrrolidone, was applied onto an aluminum foil, and was then dried and compressed to produce a positive electrode sheet.

2. Production of Negative Electrode Sheet

A negative electrode active material (graphite), a conduction-assisting agent (VGCF) and binders (SBR+CMC) were mixed together at a mixing ratio of 97:0.5:2.5 by mass, and then the mixture was mixed with N-methylpyrrolidone to produce a negative electrode mix slurry. The charging capacity of the positive electrode when charged at 4.2 V was calculated, and the negative electrode mix slurry was applied onto a copper foil (a negative electrode current collector) in such a manner that the (lithium ion storable capacity of negative electrode)/(charging capacity of positive electrode) ratio became 1.1. The resultant product was dried and then compressed to produce a negative electrode sheet.

3. Production of Laminate-Type Lithium Ion Secondary Battery

An aluminum tab and a nickel tab were welded to a non-coated portion of each of one sheet of the above-produced positive electrode sheet and one sheet of the above-produced negative electrode sheet, and then these electrode sheets were allowed to face each other with a polyethylene-made separator interposed therebetween. The resultant product was wound with a winder to produce a wound article. The wound article was sandwiched between an aluminum laminate film which was already subjected to a drawing press processing at a proper depth and an untreated aluminum laminate film, and the inside of each of the aluminum laminate films was filled with a mixed solvent electrolyte solution produced in each of examples A-1 to A-3 and Comparative Example A-1. The resultant product was hermetically sealed under vacuum conditions to produce a laminate-type lithium ion secondary battery having a capacity of 1 Ah.

4. Evaluation of Battery

Specific Capacity (mAh/g)

The laminate-type lithium ion secondary battery was charged for 5 hours under specific charging conditions (0.5 C, 4.2 V, a constant current/constant voltage mode) under an environment at a temperature of 25° C. using a charge-discharge tester (ACD-01, manufactured by Aska Electronic Co., Ltd.; the same tester was used in the following procedures). Subsequently, the battery was discharged under specific discharging conditions (0.2 C, discharge termination voltage: 3.0 V, a constant current discharging mode). The first-round discharge capacity was recorded, and the specific capacity on mass basis of the battery was calculated in accordance with the equation shown below. In this manner, the initial discharge property was evaluated. Specific capacity on mass basis (mAh/g)=(first-round charge capacity of battery (mAh))/(mass (g) of positive electrode active material)

5. Storage Properties at High Temperature]

After the measurement of the specific capacity, the laminate-type lithium ion secondary battery was charged under specific charging conditions (1 C, 4.2 V, or cut off 0.02 C in a constant current/constant voltage mode) under an environment at a temperature of 25° C. using a charge-discharge tester. Subsequently, the battery was discharged under specific discharging conditions (0.2 C, discharge termination voltage: 3.0 V, a constant current discharging mode), and was then charged again under specific charging conditions (1 C, 4.2 V, cut off 0.02 C in a constant current/constant voltage mode). A cell thus produced was stored in a thermostatic chamber at 60° C. for 1 month. The cell before and after the storage was immersed in water, and the volume of the cell before the storage and the volume of the cell after the storage were measured. From the difference between the volume of the cell before the storage and the volume of the cell after the storage, the amount of swelling of the cell after the storage was determined. The results are shown in Table 12.

TABLE 12

| | Volatilization condition | Residual solvent amount in electrolyte solution material ppm | | Residual solvent amount in electrolyte solution ppm | | Volume expansion at 60° C. for one month ml |
|---|---|---|---|---|---|---|
| | | Butyl acetate | Dichloromethane | Butyl acetate | Dichloromethane | |
| Example A-1 | 1 kPa | 85 | 40 | 8 | 4 | 0.03 |
| Example A-2 | 40 kPa | 96 | 308 | 9 | 29 | 0.03 |
| Example A-3 | 100 kPa | 150 | 1280 | 17 | 119 | 0.06 |
| Comparative example A-1 | none | 208 | 4621 | 19 | 430 | 0.21 |

Example B-1

Materials were introduced into a mixing tank in the order of introduction shown in Table 13 to produce a non-aqueous electrolyte solution. In the table, LiFSI and EC, of each of which the order of introduction was "1", were used in the form of an electrolyte solution material that was prepared previously by mixing 11.22 kg of LiFSI with 36.36 kg of EC. The electrolyte solution material was introduced into the mixing tank (capacity: 150 L), and then 27.82 kg of EMC and 35.81 kg of diethyl carbonate (sometimes abbreviated as "DEC", hereinafter), which served as electrolyte solution preparation solvents, and 9.12 kg of $LiPF_6$ (manufactured by Kishida Chemical Co., Ltd.), which served as the above-mentioned another electrolyte salt, were introduced into the mixing tank in this order. The resultant mixture was stirred for 10 minutes to produce a non-aqueous electrolyte solution. In this regard, 10 minutes was required for the introduction of each of the electrolyte solution material, the electrolyte solution preparation solvents and the above-mentioned another electrolyte salt. In the table, "required time" is a time from the initiation of the introduction to the termination of the introduction. The introduction of each of the materials was carried out while stirring. The liquid temperature after the introduction of each of the materials into the mixing tank was measured, and the results are shown in Table 13. In other Examples, the measurement of the temperature was carried out in the same manner.

TABLE 13

| Order of introduction | Introduced materials | Amount of introduction | | | | | Input ratio* (volume) | Required time (minute) | Liquid temperature after introduction (° C.) |
|---|---|---|---|---|---|---|---|---|---|
| | | Mw | Specific gravity | mol | kg | L | | | |
| 1 | LiFSI | 187 | 2.32 | 0.6 | 11.22 | 4.8 | | 10 | 25 |
| | EC | | 1.32 | | 36.36 | 27.54 | 3 | | |
| 2 | EMC | | 1.01 | | 27.82 | 27.54 | 3 | 10 | |
| 3 | DEC | | 0.975 | | 35.81 | 36.72 | 4 | 10 | |
| 4 | LiPF$_6$ | 152 | 2.72 | 0.6 | 9.12 | 3.4 | | 10 | 45 |
| — | — | — | — | — | — | — | — | 10 | |
| | TOTAL | | | | 120.3 | 100 | | 50 | |

*"Input ratio" represents the ratio of the introduced amount of EC, EMC and DEC.

As shown in Table 13, the liquid temperature in the mixing tank was measured in the course of the production of the non-aqueous electrolyte, the liquid temperature never exceeded 60° C. Specifically, the generation of heat did not occur upon the introduction of the electrolyte solution preparation solvents (EMC, DEC) into the electrolyte solution material. After the introduction of LiPF$_6$, the liquid temperature increased 45° C., but the decomposition of the electrolyte did not occur.

Example B-2

Materials were introduced into a mixing tank in the order of introduction shown in Table 14 to produce a non-aqueous electrolyte solution. Specifically, an electrolyte solution material prepared by mixing 11.22 kg of LiFSI with 20.0 kg of EC was introduced into the mixing tank (capacity: 150 L), and then 27.82 kg of EMC and 35.81 kg of DEC, which served as electrolyte solution preparation solvents, were introduced into the mixing tank. Subsequently, 16.36 kg of EC which served as an electrolyte solution preparation solvent and was heated to 60° C. was introduced into the mixing tank, and then 9.12 kg of LiPF$_6$ which served as the above-mentioned another electrolyte salt was introduced thereinto. The resultant solution was stirred for 10 minutes to produce a non-aqueous electrolyte solution. In this regard, 10 minutes was required for the introduction of each of the electrolyte solution material, the electrolyte solution preparation solvents and the above-mentioned another electrolyte salt.

The liquid temperature in the mixing tank was measured in the course of the production of the non-aqueous electrolyte. The liquid temperature never exceeded 60° C. Specifically, the generation of heat did not occur upon the introduction of the electrolyte solution preparation solvents (EMC, DEC) into the electrolyte solution material. The liquid temperature increased 30° C. after the introduction of EC that was heated to 60° C., and the liquid temperature increased 50° C. after the introduction of LiPF$_6$. However, the decomposition of the electrolyte did not occur.

Comparative Example B-1

Materials were introduced into a mixing tank in the order of introduction shown in Table 15 to produce a non-aqueous electrolyte solution. Specifically, 36.36 kg of an EC solution that was heated to 60° C. was introduced into the mixing tank, and then 27.82 kg of EMC and 35.81 kg of DEC were further introduced thereinto to produce a non-aqueous solvent solution. Subsequently, LiFSI was introduced into the mixing tank. In this regard, LiFSI was introduced in divided three portions (11.22 kg/portion) (3.74 kg in total) so as to prevent the liquid temperature from exceeding 55° C. Subsequently, LiPF$_6$ was introduced in divided three portions (9.12 kg/portion) (3.04 kg in total). After the introduction, the resultant solution was stirred for 10 minutes to produce a non-aqueous electrolyte solution. The time required for the introduction of each of the electrolyte solution preparation solvents, LiFSI and LiPF$_6$ was 10 minutes. The time required for the introduction of each of LiFSI and LiPF$_6$ was expressed in the total time (10 minutes/portion×3 portions).

TABLE 14

| Order of introduction | Introduced materials | Amount of introduction | | | | | Input ratio (volume) | Required time (minute) | Liquid temperature after introduction (° C.) |
|---|---|---|---|---|---|---|---|---|---|
| | | Mw | Specific gravity | mol | kg | L | | | |
| 1 | LiFSI | 187 | 2.32 | 0.6 | 11.22 | 4.8 | | 10 | 25 |
| | EC | | 1.32 | | 20.00 | 15.15 | 1.65 | | |
| 2 | EMC | | 1.01 | | 27.82 | 27.54 | 3 | 10 | |
| 3 | DEC | | 0.975 | | 35.81 | 36.72 | 4 | 10 | |
| 4 | EC | | 1.32 | | 16.36 | 12.39 | 1.35 | 10 | 30 |
| 5 | LiPF$_6$ | 152 | 2.72 | 0.6 | 9.12 | 3.4 | | 10 | 50 |
| — | — | — | — | — | — | — | — | 10 | |
| | TOTAL | | | | 120.3 | 100.0 | | 60 | |

TABLE 15

| Order of introduction | Introduced materials | Mw | Specific gravity | mol | Amount of introduction kg | L | Input ratio (volume) | Required time (minute) | Liquid temperature after introduction (° C.) |
|---|---|---|---|---|---|---|---|---|---|
| 1 | EC |  | 1.32 |  | 36.36 | 27.54 | 3 | 10 | 60 |
| 2 | EMC |  | 1.01 |  | 27.82 | 27.54 | 3 | 10 |  |
| 3 | DEC |  | 0.945 |  | 35.81 | 36.72 | 4 | 10 | 40 |
| 4 | LiFSI | 187 | 2.32 | 0.6 | 11.22 | 4.8 |  | 30 |  |
| 5 | LiPF$_6$ | 152 | 2.72 | 0.6 | 9.12 | 3.4 |  | 30 |  |
| — | — | — | — | — | — | — | — | 10 |  |
|  | TOTAL |  |  |  | 120.33 | 100 |  | 100 |  |

The liquid temperature in the mixing tank was measured in the course of the production of the non-aqueous electrolyte solution. The liquid temperature never exceeded 60° C. Specifically, the generation of heat did not occur upon the introduction of the electrolyte solution preparation solvents (EMC, DEC) into the EC solution. The liquid temperature after the preparation of the non-aqueous solvent solution was 40° C. (the order of introduction: 3). Because each of LiFSI and LiPF$_6$ was subsequently introduced in divided portions, the increase in temperature was prevented and, therefore, the decomposition of the non-aqueous electrolyte solution did not occur. However, it took long time to add LiFSI and LiPF$_6$, and therefore productivity was poor.

Comparative Example B-2

Materials were introduced into a mixing tank in the order of introduction shown in Table 16 to produce a non-aqueous electrolyte solution. Specifically, a non-aqueous solvent solution (40° C.) was prepared in the same manner as in Comparative Example 1, and then 11.22 kg of LiFSI was introduced. Subsequently, 9.12 kg of LiPF$_6$ was introduced. After the introduction, the resultant solution was stirred for 10 minutes to produce a non-aqueous electrolyte solution. In this regard, 10 minutes was required for the introduction of each of the electrolyte solution preparation solvents, LiFSI and LiPF$_6$.

used as the starting material and the electrolyte solution preparation solvents and the above-mentioned another electrolyte salt were added to the electrolyte solution material, the liquid temperature was kept at a lower temperature even the generation of heat occurred. As a result, the decomposition of the non-aqueous electrolyte solution was prevented and a non-aqueous electrolyte solution having good quality was produced. In addition, the time required for the preparation of the non-aqueous electrolyte solution was 50 to 60 minutes, and therefore the production efficiency was superior compared with Comparative Example B-1.

In Comparative Example B-1, in contrast, LiFSI and LiPF$_6$ were introduced in divided portions in order to control the temperature so as to prevent the decomposition of the non-aqueous electrolyte solution. As a result, although the increase in temperature was prevented, the time required for the preparation of the non-aqueous electrolyte solution became long (120 minutes), and therefore the production efficiency was poor compared with Examples B-1 and B-2.

In Comparative Example B-2, LiFSI and LiPF$_6$ were introduced in one portion, not in divided portions, after the preparation of the non-aqueous solvent solution. As a result, although the time required for the preparation of the non-aqueous electrolyte solution was reduced, the increase in temperature was not prevented, and therefore the non-aqueous electrolyte solution was decomposed and was discolored.

TABLE 16

| Order of introduction | Introduced materials | Mw | Specific gravity | mol | Amount of introduction kg | L | Input ratio (volume) | Required time (minute) | Liquid temperature after introduction (° C.) |
|---|---|---|---|---|---|---|---|---|---|
| 1 | EC |  | 1.32 |  | 36.36 | 27.54 | 3 | 10 | 60 |
| 2 | EMC |  | 1.01 |  | 27.82 | 27.54 | 3 | 10 |  |
| 3 | DEC |  | 0.945 |  | 35.81 | 36.72 | 4 | 10 | 40 |
| 4 | LiFSI | 187 | 2.32 | 0.66 | 11.22 | 4.8 |  | 10 | 55 |
| 5 | LiPF$_6$ | 152 | 2.72 | 0.6 | 9.12 | 3.4 |  | 10 | 75 |
| — | — | — | — | — | — | — | — | 10 |  |
|  | TOTAL |  |  |  | 120.3 | 8.2 |  | 60 |  |

The liquid temperature after the introduction of LiFSI increased to 55° C., and the liquid temperature after the introduction of LiPF$_6$ increase to 75° C. The non-aqueous electrolyte solution was discolored in pale orange, and the decomposition of the electrolyte occurred.

From the results of Examples B-1, B-2 and Comparative Examples B-1 and B-2, the following thing is demonstrated. As shown in Examples B-1 and B-2, when the electrolyte solution material which was prepared previously by mixing the fluorosulfonylimide salt (1) with ethylene carbonate was From the results mentioned above, it is found that, when the electrolyte solution material according to the present invention, which contains a fluorosulfonylimide salt (1) and a cyclic carbonate-based solvent or a cyclic ester-based solvent as the main components, is used, the increase in temperature during the production process can be controlled properly, and therefore an effect of preventing the decomposition of the resultant non-aqueous electrolyte solution can be achieved and it becomes possible to prepare a non-aqueous electrolyte solution within a shorter time with higher efficiency compared with the conventional techniques.

INDUSTRIAL APPLICABILITY

The electrolyte solution material produced by the production method according to the present invention can be used suitably as a material for an ionic conductor that constitutes a primary battery, a battery having a charge/discharge mechanism such as a lithium ion secondary battery and a fuel cell or an electrical storage device (an electrochemical device) such as an electrolytic capacitor, an electric double-layer capacitor, a solar cell and an electrochromic display element.

The invention claimed is:
1. An electrolyte solution material comprising a fluorosulfonyl imide salt represented by the following general formula (1):

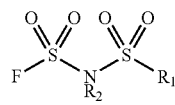

(1)

wherein $R_1$ represents a fluorine atom or fluorinated alkyl group having 1 to 6 carbon atoms, $R_2$ represents an alkali metal ion, and
an electrolyte solution solvent,
wherein:
a concentration of the fluorosulfonyl imide salt contained in the electrolyte solution material is at least about 33 mass %,
the electrolyte solution solvent is at least one selected from the group consisting of a dimethyl carbonate, an ethylmethyl carbonate and a diethyl carbonate, and
a residual amount of a fluorosulfonyl imide salt production solvent contained in the electrolyte solution material is 150 ppm or less,
the fluorosulfonyl imide salt production solvent is at least one selected from the group consisting of water, an alcohol-based solvent, a carboxylic acid-based solvent, a ketone, a nitrile-based solvent, an ester-based solvent, an aliphatic ether-based solvent, a halogen-based solvent, a nitro-group-containing solvent, a nitrogenated organic solvent, a glyme-based solvent, and an aromatic hydrocarbon-based solvent,
the electrolyte solution material has a liquid form, and
the residual amount of the fluorosulfonyl imide salt production solvent is a total amount in the electrolyte solution material.

2. A non-aqueous electrolyte solution produced from the electrolyte solution material according to claim 1.

3. An electrical storage device comprising the non-aqueous electrolyte solution according to claim 2.

4. The electrolyte solution material of claim 1, wherein the residual amount of a fluorosulfonyl imide salt production solvent contained in the electrolyte solution material is 100 ppm or less.

5. The electrolyte solution material of claim 1, wherein the fluorosulfonyl imide salt production solvent is water and at least one selected from the group consisting of the alcohol-based solvent, the carboxylic acid-based solvent, the ketone, the nitrile-based solvent, the ester-based solvent, the aliphatic ether-based solvent, the halogen-based solvent, the nitro-group-containing solvent, the nitrogenated organic solvent, the glyme-based solvent, and an aromatic hydrocarbon-based solvent.

* * * * *